P. GADBOIS.
PUSHCART.
APPLICATION FILED APR. 2, 1919.

1,341,013.

Patented May 25, 1920.

Inventor,
Paul Gadbois
by H. S. Johnson
his Attorney.

UNITED STATES PATENT OFFICE.

PAUL GADBOIS, OF ST. PAUL, MINNESOTA.

PUSHCART.

1,341,013.

Specification of Letters Patent. Patented May 25, 1920.

Application filed April 2, 1919. Serial No. 286,998.

*To all whom it may concern:*

Be it known that I, PAUL GADBOIS, a citizen of the United States, residing at St. Paul, in the county of Ramsey and State of Minnesota, have invented certain new and useful Improvements in Pushcarts, of which the following is a specification.

This invention relates to improvements in push carts and has for its object to provide means in a device of this character, whereby the latter may be easily lifted over offsets on the ground or floor surfaces such as curbs, steps and the like.

A further object of the invention is to provide a device of the character described, which may be useful as a medium for transporting small merchandise, such as is commonly carried by street venders, but may also at any time, without entailing the removal or addition of any parts, be used as a dump cart for transporting sand and the like.

The invention consists in the features of construction, combination and arrangement of parts hereinafter described and claimed.

Referring to the drawings.

Figure 1:
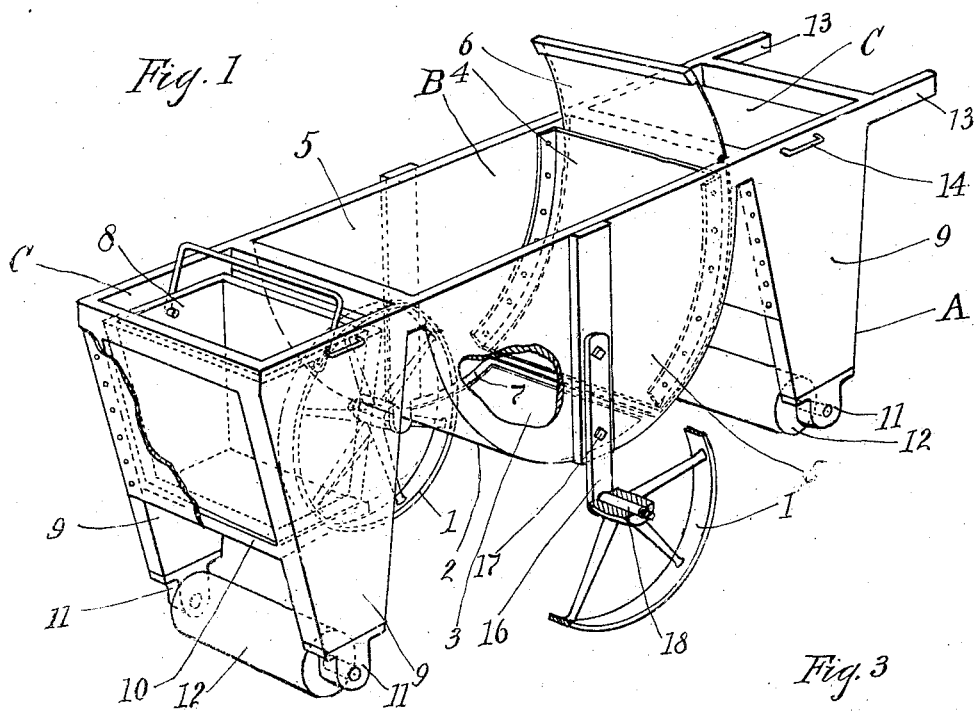
Figure 1, is a perspective view of a push cart embodying the invention.
Figure 2:
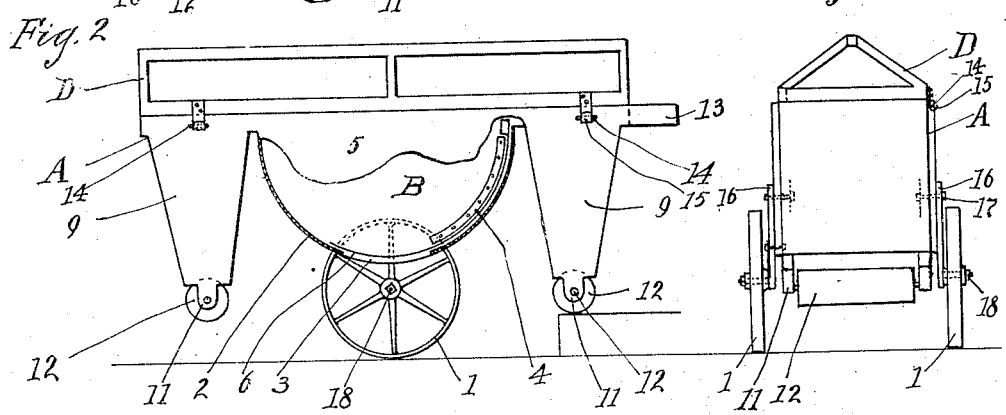
Fig. 2, is a side elevation of same.
Figure 3:
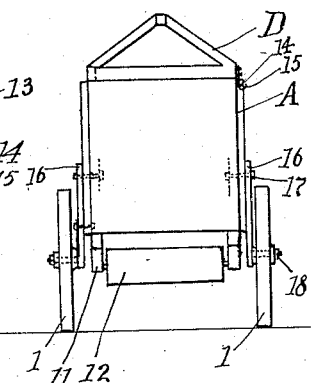
Fig. 3, is an end elevation of same.

In the drawings, A represents the body of a push cart supported midway between its ends on a pair of wheels 1. The body is formed with three bins arranged in a row, the center bin B having a semi-circular main bottom 2 with a discharge opening 3 midway between its ends. An auxiliary circular bottom 4 spaced from the main bottom and secured to the sides 5 of the bin B, extends from the upper edge of the end wall of the bin to the edge of the discharge opening. A circular slide 6 is adapted to be slid back and forth between said main and auxiliary bottom, and to pass over and thereby close said opening, a ledge 7 formed by the main bottom at either side of the discharge opening and serving as supports for said slide. Thus, the auxiliary bottom receives the pressure of the down-pressing load, that comparatively short portion only, of the slide, which serves as a closure for the discharge opening, receiving downward pressure to be overcome by the operator in withdrawing the slide 6. Flanking the bin B at each end, are the downwardly tapered bins C, wide at the top and open to receive tapered buckets 8, one of which is shown in Fig. 1. The buckets are specially adapted for carrying liquids owing to their symmetrical arrangement around the axis of rotation of the wheels 1. The side walls 9 of the bins C extend downward beyond the bottom 10 of the bins, and carry journal boxes 11 which are journaled to rotate in parallelism with the wheels, the rollers 12. As shown in Fig. 2, the level in which lies the rolling contact of the rollers 12, is somewhat above that of the wheels, so that a roller may be first suspendedly pushed over a curb, and then brought to bear and roll thereon. The farther end of the body A may then be lifted by means of the handles 13 to bring the wheels to the right level. Along one upper edge of the body and on the side thereof are a pair of laterally extending staples 14 adapted to receive the hooks 15 secured to a skeleton cover frame D, which may be covered with a cloth in inclement weather.

Figure 4:
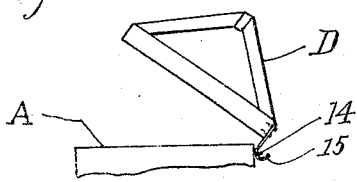
Fig. 4, is a fragmentary end view showing the cover of the cart in tilted position.

As shown in Fig. 4, the lid may be tilted and removed if desired. Each wheel 1, is mounted separately on the body A on its respective side thereof, the mounting for each wheel comprising a bar 16 firmly bolted by means of bolts 17 to the sides 5, and a bearing pin 18, firmly secured to said bar and having a threaded end provided with a retaining nut 19 to hold the wheel positioned thereon.

I claim:

1. In a push cart, the combination with a comparatively long narrow body, and supporting wheels therefor, of an open top bin rigidly mounted between said wheels, said bin having a main curved bottom, a discharge opening in said bottom, a curved slide in said bin conforming to the curvature of said main bottom and adapted to be slid thereon to cover said opening and an auxiliary bottom spaced from said main bottom and above said slide to cover the latter for the purpose set forth.

2. In a push cart, the combination with a comparatively long narrow body, and supporting wheels therefor, of an open top bin rigidly mounted between said wheels, said bin having a main curved bottom, a discharge opening in said bottom, an auxiliary bottom spaced from the main body extending from one side of said discharge opening to the top of said bin, a curved slide in the space between the auxiliary and main bottom, and adapted to be slid over said opening, said slide being operable from a point above said bin.

In testimony whereof I affix my signature in presence of a witness.

PAUL GADBOIS.

Witness:
GEORGE VOELKER.